United States Patent [19]

Kleinschnitz, Jr.

[11] 4,290,689
[45] Sep. 22, 1981

[54] MOVING EXPOSURE SYSTEM

[76] Inventor: Donald J. Kleinschnitz, Jr., 5240 Sutton Ave., Melbourne, Fla. 32901

[21] Appl. No.: 177,222

[22] Filed: Aug. 11, 1980

[51] Int. Cl.³ .................. G03B 27/00; B41B 13/00
[52] U.S. Cl. ........................................... 355/1; 354/5
[58] Field of Search ........................ 354/5; 355/1, 8

[56] References Cited

U.S. PATENT DOCUMENTS

| | | | |
|---|---|---|---|
| 3,448,458 | 6/1969 | Carlson et al. | 354/5 X |
| 3,749,487 | 7/1973 | Grier et al. | 355/1 |
| 3,824,604 | 7/1974 | Stein | 354/5 |
| 3,836,917 | 9/1974 | Mee | 354/5 |
| 4,000,495 | 12/1976 | Pirtle | 354/5 X |

OTHER PUBLICATIONS

I.B.M. Technical Disclosure Bulletin, vol. 5, No. 4, 9/1962 p. 57, Rutter, 355-358.

Primary Examiner—Donald A. Griffin
Attorney, Agent, or Firm—Duckworth, Hobby, Allen, Dyer & Pettis

[57] ABSTRACT

A moving exposure system is provided having a semiconductor light source, which may be incorporated in a module with modulating electronics, and disposed on a moveable platform for exposing a special surface to light rays. The moving exposure system can be optically coupled to a printer's photoconductive element by means of a flat field correction device such as a lens or a fiber optic bundle, in the case of rotating motion of the light source, which maximizes the area exposed while minimizing the bulk of the exposure apparatus.

18 Claims, 10 Drawing Figures

MOVING EXPOSURE SYSTEM

BACKGROUND OF THE INVENTION

This invention relates to exposure systems in general, and more specifically to devices which utilize light rays to expose some special surface in order to produce various effects.

A number of devices require the exposing of some special surface to light rays in order to produce various desired effects. In a photographic process, for example, a photosensitive surface is commonly used. In such cases the surface that is sensitive to radiant energy can be either film or paper. In electrophotographic processes, a photoconductive surface (one that has its electrical conductivity changed by radiant energy) is used. Such systems find application in printers which utilize a light source to electrically charge or discharge a previously blanket charged portion of a photoconductive surface, usually a drum, in a patterned manner to permit application of toner, or ink, which is then transferred eventually to a paper to create a printed document.

In prior art printer systems, a master light source, usually a large, linearly constructed laser is used. In such systems, it is necessary to deflect laser light beams by means of a rotating mirror system, or an acousto-optic crystal system in order to produce the desired pattern resulting in printed characters. Modulation (turning on and off) of the beam is accomplished by electronic circuitry external to the laser. Such systems are generally bulky and costly, and they necessarily physically separate the light source, modulation and scanning elements of the photoconductor discharge system. Another disadvantage was that the speed of operation of the existing systems was necessarily limited because of the larger size.

SUMMARY OF THE INVENTION

The moving exposure system of this invention is characterized by a semi-conductor light source, such as a light emitting diode or a laser diode mounted on a movable platform. The light exposure system can be modularized by combining the semi-conductor light source and a modulating electronic circuit in a case thereby providing a single module. The exposure system can be incorporated in an electro-photographic printer by coupling the exposure system physically, electrically and optically to the printer. Flat field correction is provided by a correction lens or an optical fiber bundle or plate, to make the moving exposure system compatible with available electro-photographic printers. The invention provides the advantage of serving as a compact, movable exposure system with a large area of exposure in relation to the size of the system.

Further features of the invention includes the design and arrangement modules and platforms combinations to increase the throughput in an electro-photographic printer.

BRIEF DESCRIPTION OF THE DRAWINGS

Further details are explained below with the help of the examples illustrated in the attached drawings in which.

DESCRIPTION OF THE PREFERRED EMBODIMENTS

Figures 1, 2:
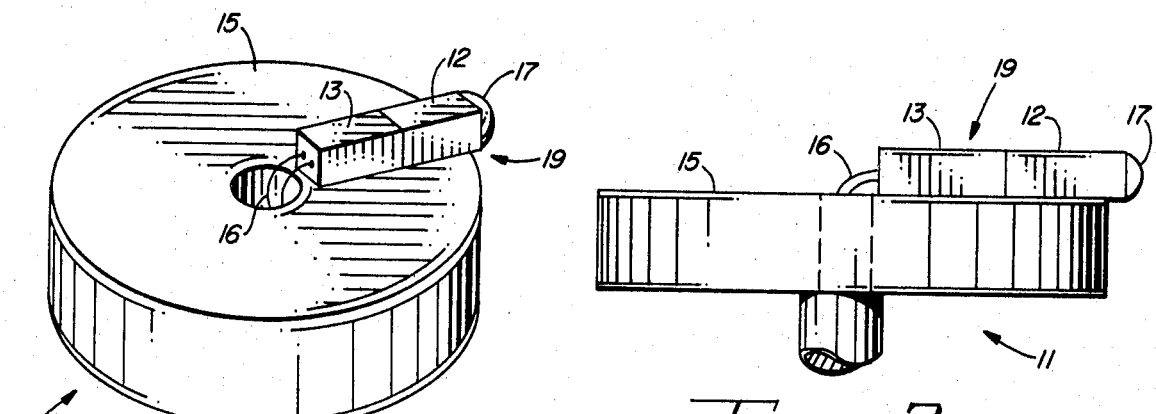
FIG. 1 is a perspective view showing one embodiment of a movable exposure system of applicant's invention.
FIG. 2 is a side view of FIG. 1 and shows various elements of a movable exposure system module.

Referring to FIG. 1 and 2, a small, moving exposure system 11, having a semi-conductor 12, such as a laser diode or high efficiency LED, is electrically coupled to modulation electronics 13, which may be disposed adjacent to the light source 12. The light souce 12 is mounted on a platform 15 and electrical connections 16 are provided to couple the light source to an outside power source (not shown). Also disposed adjacent to the light source is an optical modification element 17, for example a lens or an optical fiber coupling element. Preferably, the light source 12, the modulation electronics 13, and the optical modification element 17 can be combined in a light souce module 19 by use of an appropriate package or case.

Figure 3:
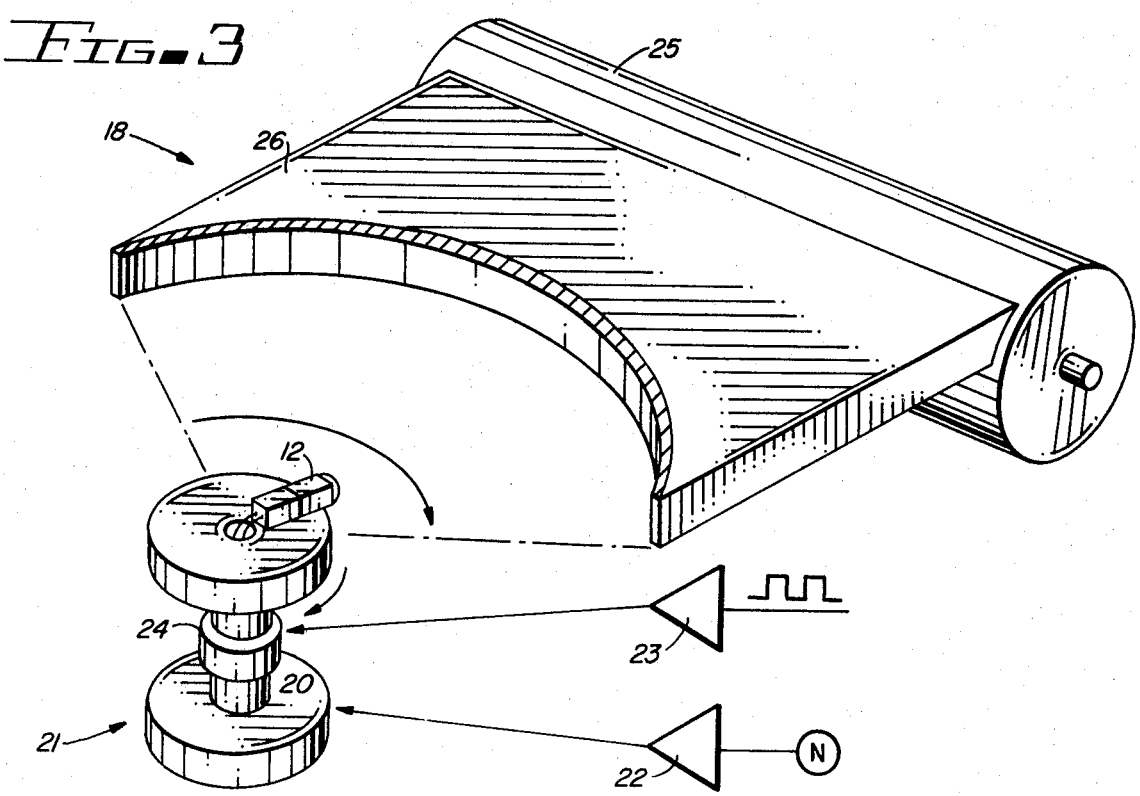
FIG. 3 is a combined schematic and pictorial representation of an exposure system physically coupled to an electrophotographic printer system.

The module 19 described in FIG. 1 can be physically mounted on electro-photographic printers in various ways. For example, in FIG. 3, the module 19 is physically coupled to an electro-photographic printers system 18 by means of a rotating shaft 20 driven by a platform motor 21 which is excited by motor control circuitry 22. In this embodiment the light source can be controlled by modulator driver circuitry 23 which could contain all of the modulation circuitry if a light source 12 only, rather than a combination module 19, was used. The modulator driver circuitry 23 can be electrically coupled by means of coupling elements 24, for example, mercury wetted slip-rings, conductive pickup, or capacitive pickup. The module 19 is optically coupled to a photoconductive element 25 in a printer by means of a flat field correction device 26, for example, an appropriately ground lens.

Figure 4:
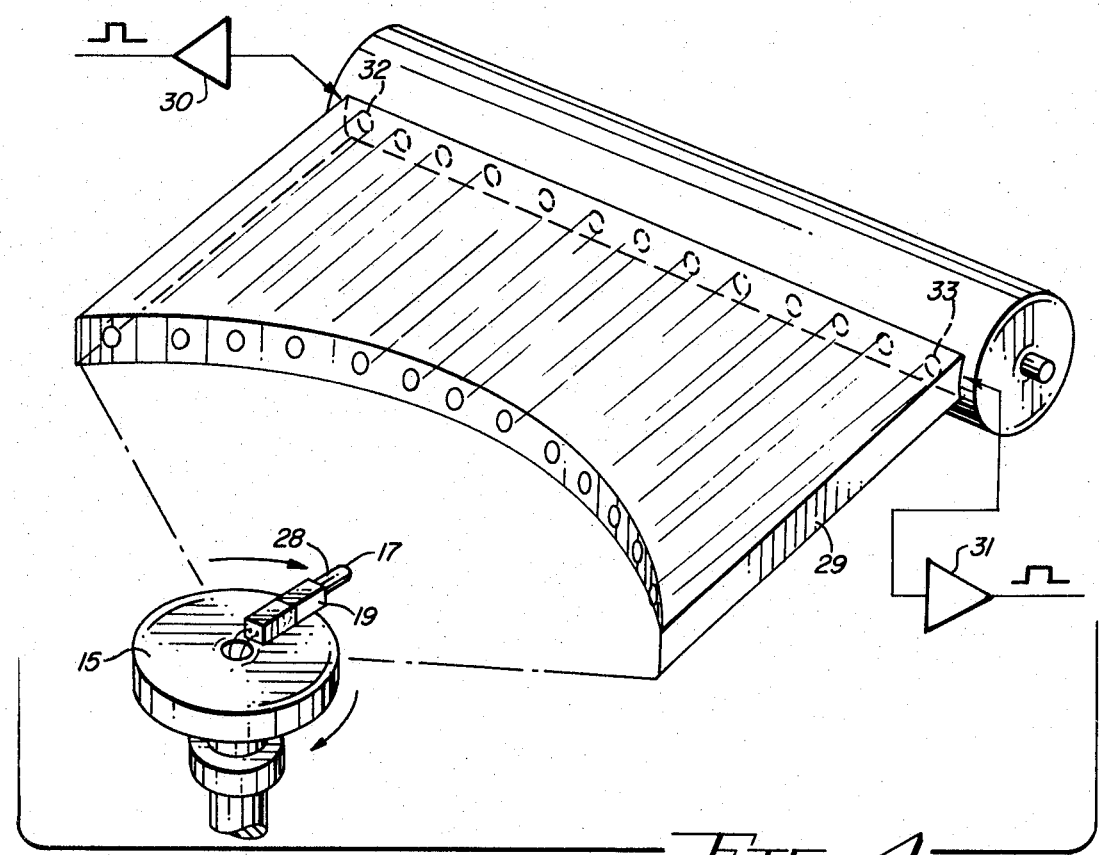
FIG. 4 shows an alternative method of coupling the exposure system to an electro-photographic printer.

As shown in FIG. 4 other embodiments incorporating the movable light souce are contemplated in this invention. In FIG. 4 the light source module 19 having the optical modification element 17, in this case a single light conducting fiber 28, is optically coupled to an optical fiber array 29 in the form of a fiber optic plate. The optical fiber array 29 provides "automatic" flat field correction, and serves as the flat field correction device. Also shown are scan control/synchronization electronic circuitry 30 and 31, for example, a start scan detector 32 and a stop scan detector 33.

Figure 5:
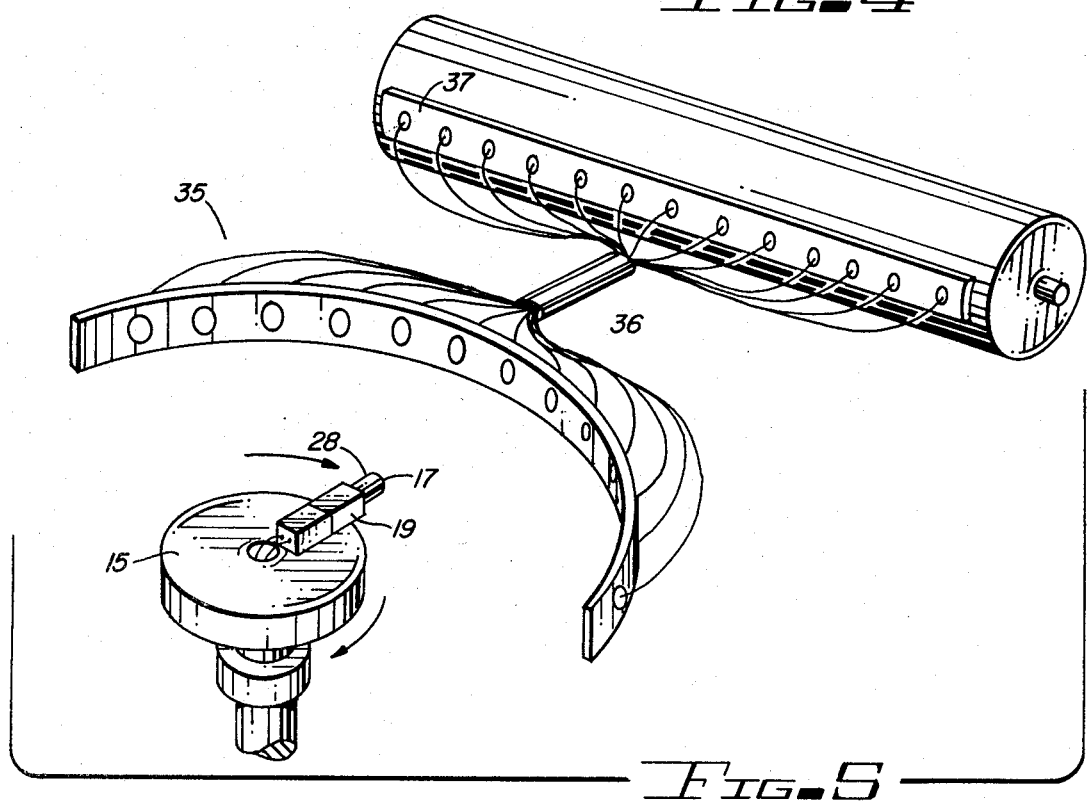
FIG. 5 shows another way of coupling the exposure system to an electro-photographic printer using fiber bundles.

Another alternative is depicted in FIG. 5 wherein the module is optically coupled to an entry array of fibers 55 which are then made into a bundle 36 and routed in some physically convenient manner to an exit array of fiber 37. The embodiments shown in FIGS. 3, 4 and 5 all incorporate means to compensate for the optical effects in conversion from the circular path of the light source to a flat field of the photoconductive element of the printer.

The advantage derived from using a modularized light source is that physical connection to a synchronized motor would produce a rotating scan, resulting in a small spinning package which can accomplish scan, as well as photoconductor light excitation and/or light modulation. The module 19 would replace the rotating mirror or acousto-optic crystal modulator, and "linear laser of state-of-the-art printers.

The scanning efficiency of the system can be increased by adding multiple modules displaced around the perimeter of a single rotating platform, which would permit more than one scan per rotation of the platform, or by placing modules on multiple platforms coupled to a single rotating shaft, which would permit scanning more than one line at the same time. These embodiments are shown in FIGS. 6-8.

Figure 6:
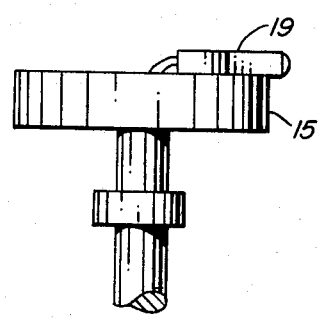
FIG. 6 shows an exposure system with a single module on a single platform.

FIG. 6 shows the embodiment using a single module 19 disposed on a single platform, the module 19 being coupled to the modulator drive to circuitry 23 through coupling element 24.

Figure 7:
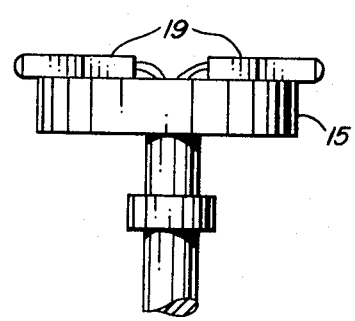
FIG. 7 shows another embodiment with two modules mounted on a single platform.

FIG. 7 shown as alternative embodiment, in which two modules 19 are disposed on a single platform, so mounted as to increase the scan efficiency and thus printers system speed on throughput, by performing more than one scan per rotation of the platform.

Figure 8:
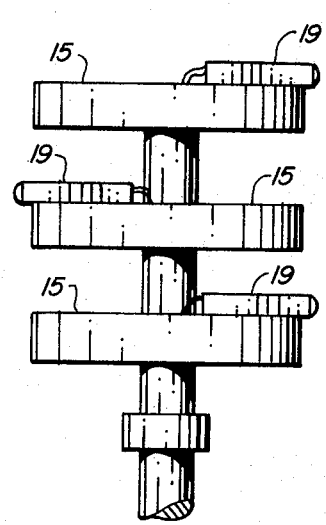
FIG. 8 shows another embodiment in which a plurality of platforms are used, each having a single exposure module.

FIG. 8 is an alternative embodiment incorporating a single module 19 (although multiples could well be used) on multiple platforms 15, which is another method of increasing efficiency by performing more than one scan at the same time.

Figure 9:
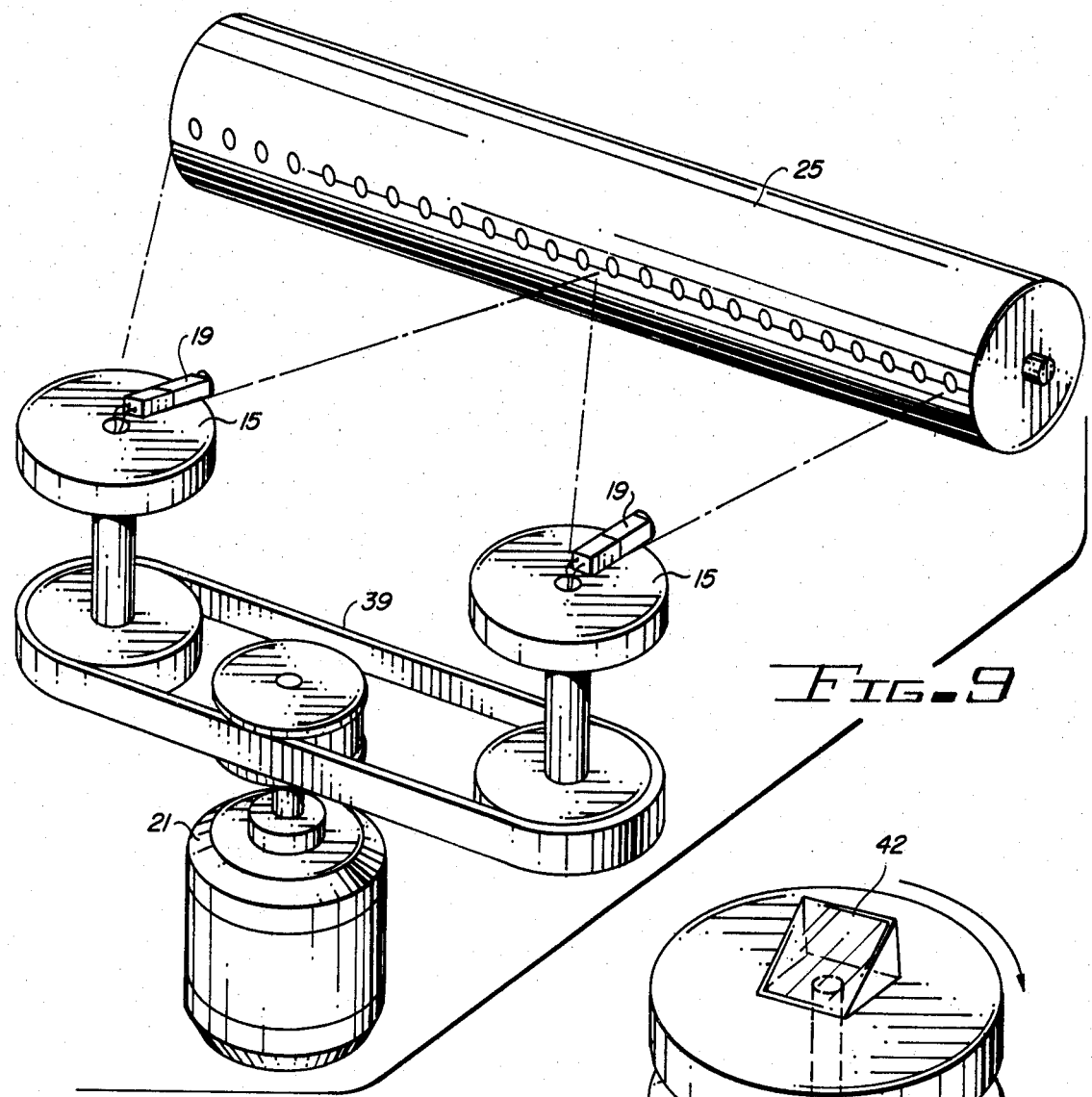
FIG. 9 illustrates another embodiment where multiple platforms are disposed in a horizontal plane.

Another embodiment which can be used for increasing throughput is shown in FIG. 9. A plurality of platforms 15 are disposed horizontally. The platforms may be mechanically coupled together by the means of a drive belt 39 or gears or other coupling means. The platforms are driven by a single motor 21 or may be driven by a plurality of synchronized motors. A module 19 is disposed on each platform to provide the light. In this manner, exposure of a large area can be achieved by limited movement of the light source modules.

Figure 10:
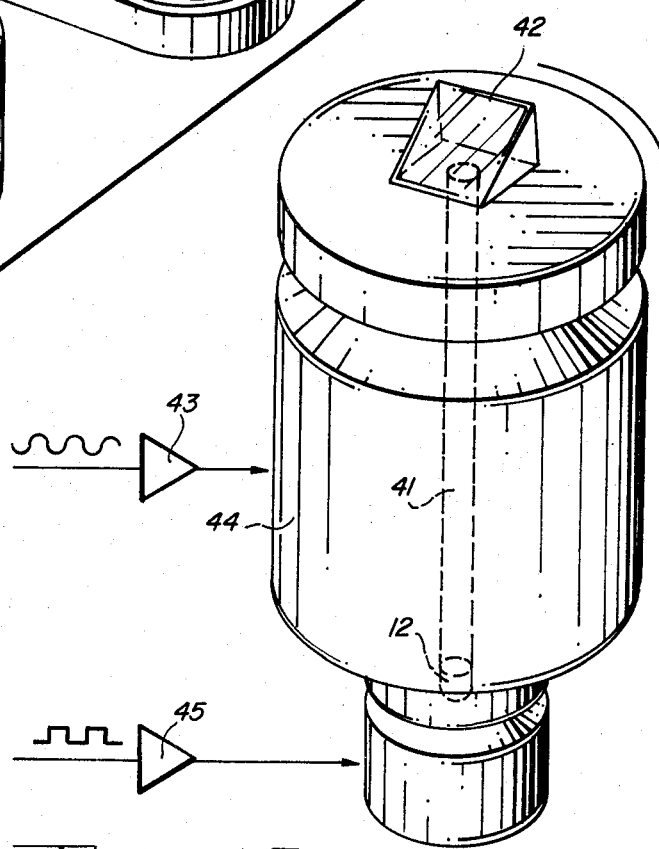
FIG. 10 illustrates another embodiment in which the light source is stationary, and a moving optical element is provided for the desired scanning.

Another modularized rotating exposure system can be provided as depicted in FIG. 10, wherein a stationary light source 12 is located at the bottom of a hollow shaft 41. Motor control electronics 42 drive a motor 43 which rotates the shaft with a light beam contained herein. Disposed on top of the shaft is an optical element 42, which can be a prism, or mirror/lens array, which couples the light beam onward for scanning. The light source is driven by driving electronics 43.

I claim:

1. Apparatus for exposing a special surface to light rays comprising:
   a semi-conductor light source with a light output;
   means coupled to said light source for modulating said light source;
   means for enabling scanning by the light output; and
   means optically coupled to the light output for optically modifying said light output whereby any optical aberration in the light output due to the scanning is corrected.

2. An apparatus in accordance with claim 1 wherein said means for enabling scanning by the light output comprises:
   a rotatable platform disposed under the light source;
   a shaft connected to said platform;
   means for rotating said shaft; and
   wherein said means for modulating said light source is coupled to said light source by means disposed on said shaft for electrically coupling the light souce to the means for modulating.

3. An apparatus for exposing a special surface to light rays comprising:
   at least one light source module each comprising a semiconductor light source with a light output, and modulating circuitry coupled and disposed adjacent to said light source; and
   means for moving said light source module whereby scanning by the light output is provided.

4. An apparatus in accordance with claim 3 wherein said module further comprises:
   a light output modification element connected to said light source; and
   means for encasing said light source, modulating circuitry, and light output modification element.

5. An apparatus in accordance with claim 4 wherein said means for moving said module comprises:
   a first rotatable platform for supporting said module; and
   means for rotating said platform so that the light output travels along a predetermined arc.

6. An apparatus in accordance with claim 5 wherein said means for rotating said platform comprises:
   a shaft connected to said platform;
   a motor mechanically coupled to said shaft; and
   motor control means coupled to said motor for driving said motor.

7. An apparatus in accordance with claim 5 further comprising:
   means optically coupled to said light output for providing a flat field correction to the light output.

8. An apparatus in accordance with claim 7 further comprising:
   means for detecting a first position of the light output; and
   means for detecting a second position of the light output, whereby completion of the scanning by the light output can be detected.

9. An apparatus in accordance with claim 7 wherein said means for providing a flat field correction comprises:
   an optical lens.

10. An apparatus in accordance with claim 7 wherein said means for providing a flat field correction comprises:
    a fiber optic plate having a plurality of optical fibers, each of said fibers having one end disposed along the arc defined by the path of travel of the light output, and another end disposed adjacent to the special surface, and wherein said light output modification element comprises a single optical fiber.

11. An apparatus in accordance with claim 7 wherein said means for providing a flat field correction comprises:
    a fiber optic bundle having a plurality of optical fibers, each of said fibers having one end disposed on the arc defined by the path of travel by the light output, and another end disposed adjacent to the special surface, said fibers being bundled together in between said ends and wherein said light output modification element comprises a single optical fiber.

12. An apparatus in accordance with claim 7 comprising:
two modules disposed on said platform.

13. An apparatus in accordance with claim 7 further comprising:
at least a second platform;
at lest one module disposed on said second platform; and
means for rotating said second platform.

14. An apparatus in accordance with claim 13 wherein said means for rotating said first and second platforms comprises:
a shaft attached to each of said platforms;
a motor; and
means for mechanically coupling said motor to said shafts.

15. An apparatus for exposing a special surface with light rays comprising:
a movable platform;
a semi-conductor light source having a light output and disposed on said platform;
modulating circuitry electronically coupled to said light source and disposed immediately adjacent to said light source;
a light output modification element connected to said light source;
means for encasing said light source, modulating circuitry and light output modification element in a single module disposed on said platform;
a shaft connected to said platform;
a motor mechanically coupled to said shaft; and
optical means optically coupled to the light output for providing a flat field correction.

16. An apparatus for exposing a special surface to light rays comprising:
a rotatable hollow shaft;
a stationary semi-conductor light source disposed within said shaft and having a light output along said shaft;
means coupled to said light source for modulating said light source;
optical means mounted on said shaft for deflecting the light output towards the special surface; and
a motor mechanically coupled to said shaft whereby the shaft can be rotated to provide scanning by the light output.

17. In an electro-photographic printer having a photoconductive surface, and an exposure system for changing a charge in the photo-conductive surface, an improved exposure system comprising:
a semi-conductor light source with a light output;
means coupled to said light source for modulating said light source;
means for enabling scanning by the light output; and
means optically coupled to the light output for optically modifying said light output whereby any optical aberration in the light output due to the scanning is corrected.

18. In an electro-photographic printer having a photoconductive surface and a light source for changing a charge in the photo-conductive surface; an improved exposure system comprising:
a rotatable hollow shaft;
a stationary semi-conductor light source disposed within said shaft and having a light output along said shaft;
means coupled to said light source for modulating said light source;
optical means mounted on said shaft for deflecting the light output towards the special surface; and
a motor mechanically coupled to said shaft whereby the shaft can be rotated to provide scanning by the light output.

* * * * *